3,149,134
EXTRACTION OF COMPLEX DIVALENT METAL CATIONS BY NAPHTHENIC ACID
Archibald William Fletcher, Stevenage, England, assignor to National Research Development Corporation, London, England, a British corporation
Filed July 6, 1962, Ser. No. 208,055
Claims priority, application Great Britain July 13, 1961
4 Claims. (Cl. 260—429.1)

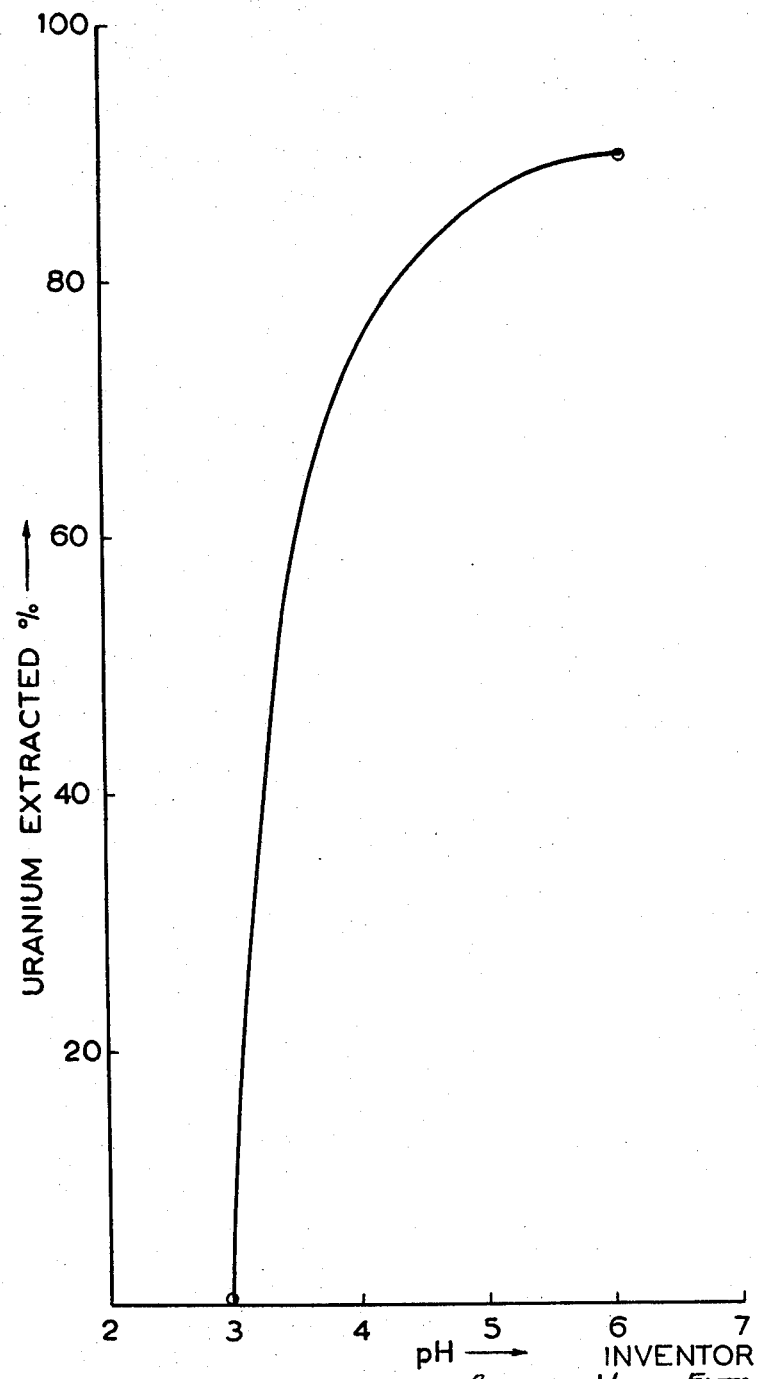

This invention relates to a process for the extraction of complex divalent uranyl cations with naphthenic acid.

My co-pending application No. 38,617, filed June 24, 1960, now U.S. Patent No. 3,055,754, describes and claims a process for extracting bivalent metals, ferric iron and aluminium from an aqueous medium containing at least one metal value in solution or suspension, which comprises contacting the aqueous medium with a solution of naphthenic acid in an inert solvent which is substantially immiscible with the aqueous medium.

It has now been found that uranium metal values present in solution in the form of a complex divalent metal cation $UO_2^{++}$ or a suspension of products of hydrolysis derived from this cation can also be extracted by contacting the solution or suspension with a solution of naphthenic acid in an inert solvent which is substantially immiscible with the aqueous medium.

The metal value is obtained by separating the naphthenic acid extract and stripping it with an acid.

Although a single stage extraction produced a good yield of the desired metal value even higher yields can be obtained by treating the aqueous raffinate obtained after the first separation with a further amount of the naphthenic acid solution and stripping the naphthenic acid extract.

In a preferred form the extraction is carried out in three stages, the raffinate from the first stage being brought to the pH of the original solution, contacted with a further amount of naphthenic acid in kerosene and the naphthenic acid extract stripped with acid. The raffinate from this second stage is similarly treated. By means of this three stage extraction up to 95% or even more of the uranium present in the original solution can be recovered.

Preferably the aqueous medium is at a pH which is not more than 0.5 of a pH unit below the pH of incipient hydrolysis of the metal value which it is desired to extract. While extractions cannot be carried out at pH values less than this value, satisfactory extractions can be carried out at higher pH values provided that other metal values whose pH of incipient hydrolysis lies between that of the desired metal value in question and the higher pH are not present.

The invention is further illustrated by the following example.

20 ml. of a 1.0M solution of naphthenic acid in kerosene were added to 20 ml. of a 0.1M aqueous solution of uranyl nitrate to which ammonia has been added until the pH was raised to 3.5 and the two phases mixed. The mixture was then allowed to stand for a few minutes to enable the phases to separate. The aqueous layer was drawn off and the organic layer stripped with 20 ml. of 5 N sulphuric acid. The amount of uranium extracted into the solvent layer determined by analysing the aqueous strip solution was found to be 60 percent.

The raffinate from this extraction was brought to pH 3.5 and again contacted with an equal volume of the solution of naphthenic acid in kerosene. The raffinate from this extraction was similarly treated. By means of this three stage process 95 percent of the uranium present in the original solution was recovered.

The effect of pH on extraction was determined by carrying out extraction of 20 ml. samples of 0.1M aqueous solution of uranyl nitrate at pH values of 3.0, 3.4, 3.9 and 6.1. The results are given in Table 1 and in the form of the graph shown in the accompanying drawing where the percentage of uranium extracted is plotted against pH.

*Table 1*

| pH of aqueous solution | | Uranium extracted, percent |
|---|---|---|
| Before extraction | After extraction | |
| 3.0 | 2.4 | 0.3 |
| 3.4 | 3.2 | 65.9 |
| 3.9 | 3.25 | 63.7 |
| 6.1 | 4.4 | 89.8 |

What I claim is:

1. A process for the extraction of uranium metal values present in aqueous media in the form selected from the group consisting of the complex divalent metal cation $UO_2^{++}$ and products of hydrolysis derived from this cation which comprises contacting the aqueous medium containing the metal with a solution of naphthenic acid in an inert solvent which is substantially immiscible with the aqueous medium and separating of the naphthenic acid extract from the aqueous raffinate.

2. A process as claimed in claim 1 wherein the pH value of the aqueous medium before extraction is not more than 0.5 of a pH unit below the pH of the incipient hydrolysis of the metal value which is to be extracted.

3. A process as claimed in claim 1 wherein the raffinate obtained after the separation is once more contacted with a solution of naphthenic acid in an inert solvent which is substantially immiscible with the aqueous medium and the naphthenic acid extract is separated off.

4. A process as claimed in claim 1 wherein the raffinate obtained after the separation is adjusted to a pH value equal to that of the original solution, contacted once again with a solution of naphthenic acid in an inert solvent which is substantially immiscible with the aqueous medium, the naphthenic acid extract separated off and the aqueous raffinate once more adjusted to a pH value equal to that of the original solution, contacted with a solution of naphthenic acid in an inert solvent which is substantially immiscible with the aqueous medium.

No references cited.